US009928081B2

(12) United States Patent
Cerri et al.

(10) Patent No.: US 9,928,081 B2
(45) Date of Patent: Mar. 27, 2018

(54) CUSTOMIZING PROGRAM LOGIC FOR BOOTING A SYSTEM

(71) Applicant: International Business Machines Corporation, Armonk, NY (US)

(72) Inventors: Fabio Cerri, Rome (IT); Gianluca Mariani, Rome (IT); Claudio Marinelli, Latina (IT); Bernardo Pastorelli, L'Aquila (IT); Antonio Secomandi, Milan (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 325 days.

(21) Appl. No.: 14/020,459

(22) Filed: Sep. 6, 2013

(65) Prior Publication Data

US 2014/0089652 A1 Mar. 27, 2014

(30) Foreign Application Priority Data

Sep. 25, 2012 (GB) .................................. 1217032.0

(51) Int. Cl.
*G06F 15/16* (2006.01)
*G06F 9/44* (2018.01)
*H04L 12/24* (2006.01)

(52) U.S. Cl.
CPC .......... *G06F 9/4411* (2013.01); *G06F 9/4416* (2013.01); *H04L 41/085* (2013.01)

(58) Field of Classification Search
CPC ........ G06F 9/4411; G06F 9/4416; G06F 9/44; H04L 41/0803; H04L 41/085
See application file for complete search history.

(56) References Cited

U.S. PATENT DOCUMENTS 5,802,365 A   9/1998 Kathail et al.
7,644,264 B1 * 1/2010 Olsen .................... G06F 9/4416
                                                      710/104

(Continued)

FOREIGN PATENT DOCUMENTS

CN    1932765      3/2007
CN    101382894   3/2009
CN    102385523   3/2012

OTHER PUBLICATIONS

Microsoft; Managing and Deploying Driver Packages; Technical Article (http://technet.microsoft.com/en-us/library/dd348456(WS.10).aspx#boot); 2009.

(Continued)

*Primary Examiner* — Moustafa M Meky
*Assistant Examiner* — Kidest Mendaye
(74) *Attorney, Agent, or Firm* — James L. Baudino

(57) ABSTRACT

A method and system are provided for generating customized program logic operable to control hardware devices of a target system and to boot said target system. The system is connected to one or more target systems via a network, the server system being adapted for: receiving a first list of device identifiers from one of the target systems; automatically selecting, for each of the device identifiers in the received first list, at least one driver operable to control the identified device from a set of drivers, thereby generating a sub-set of said set of drivers; providing a core program logic to the target system; and providing the sub-set of drivers to the target system, wherein a combination of the sub-set of drivers and the core program logic constitutes a customized program logic operable to control the devices of said target system.

2 Claims, 4 Drawing Sheets

(56) References Cited

U.S. PATENT DOCUMENTS

| | | | |
|---|---|---|---|
| 8,041,793 B2 | 10/2011 | Chawla et al. | |
| 8,046,450 B1* | 10/2011 | Schloss | H04L 41/0809 709/220 |
| 8,132,186 B1* | 3/2012 | Okcu | G06F 13/102 717/174 |
| 9,317,268 B2* | 4/2016 | Levijarvi | G06F 8/61 |
| 2004/0260678 A1 | 12/2004 | Verbowski et al. | |
| 2005/0027831 A1* | 2/2005 | Anderson | G06F 8/63 709/220 |
| 2005/0198650 A1 | 9/2005 | Ford et al. | |
| 2007/0070894 A1* | 3/2007 | Wang et al. | 370/230 |
| 2007/0101342 A1* | 5/2007 | Flegg | G06F 9/4411 719/321 |
| 2007/0143379 A1 | 6/2007 | Dalfo et al. | |
| 2007/0169116 A1* | 7/2007 | Gujarathi | G06F 9/4411 717/174 |
| 2008/0092134 A1* | 4/2008 | Zhang | G06F 8/61 717/174 |
| 2008/0172555 A1 | 7/2008 | Keenan | |
| 2009/0013061 A1* | 1/2009 | Winter | G06F 9/4416 709/222 |
| 2011/0173639 A1 | 7/2011 | Coronado et al. | |
| 2011/0225405 A1* | 9/2011 | Lyons | G06F 9/4406 713/2 |
| 2011/0320799 A1 | 12/2011 | Lam | |
| 2012/0110567 A1* | 5/2012 | Lyons | G06F 8/61 717/177 |
| 2013/0138783 A1* | 5/2013 | Mallur | G06F 8/65 709/221 |
| 2013/0205292 A1* | 8/2013 | Levijarvi | G06F 11/1415 717/177 |

OTHER PUBLICATIONS

Office Action; China Patent Application No. 201310450563.6; dated Apr. 19, 2016.

* cited by examiner

CUSTOMIZING PROGRAM LOGIC FOR BOOTING A SYSTEM

BACKGROUND

In a growing number of network-boot environments, the operating system (and a corresponding deployment engine) used for booting a target system is deployed from a server system via a network to each of the target systems. For example, in so-called 'bare metal environments', the hard disks (the usual medium on which a computer's operating system is installed) of the target systems may not comprise an operating system or any other bootable program code. Therefore, said bootable code needs to be transferred from a server via a network. This eases the maintenance of the target systems and also allows to flexibly deploy different operating systems on the target systems as needed.

The transferred operating system or deployment engine must comprise at least the drivers for accessing the hard disks of the target systems in order to write the operating system to said hard disks. In several network boot environments, initial network capabilities may be already provided by the target system for downloading a deployment engine. However, the capabilities of said initial network are rather limited. Therefore, while downloading a deployment engine via a network connection provided by said limited initial network capabilities, the target system may receive additional network drivers providing extended network capabilities. The target system may shut down the limited, initial network support used for downloading the deployment engine and pass control to the deployment engine which uses the additional network drivers for controlling the target computer's network card. Thus, at least some drivers need to be transmitted from the server to the respective target system for allowing the deployed operating system to control the hardware devices of said target system and to boot and operate the target system. Said hardware devices may comprise printers, scanners, graphic cards, and the like.

A problem connected with current network-boot approaches is that the hardware device composition of the target systems—and accordingly, the drivers that need to be provided to the individual target systems—may not be uniform. In order to guarantee that the deployed operating system or deployment engine is operable to control the hardware devices of each of a plurality of different target systems, current operating systems and deployment engines used for network boots in heterogeneous environments comprise a plurality of different drivers covering many more hardware devices than is actually contained in the target systems. Thus, although only a fraction of said drivers may actually be used by any of the target systems, a plurality of other drivers which are never used by the target systems (as they do not comprise the respective hardware devices) are also transferred as part of the operating system or as part of the deployment engine. This increases the amount of data deployed, increases network traffic, reduces the speed of deployment and increases the risk of delivering conflicting drivers to the target system. Conflicts may also be caused (e.g., by two drivers developed by different hardware vendors for the same disk controller).

BRIEF SUMMARY

According to a first aspect of the present invention, there is provided a method, system and computer program product for customizing program logic for booting a system. The system is connected to one or more target systems via a network, the server system being adapted for: receiving a first list of device identifiers from one of the target systems; automatically selecting, for each of the device identifiers in the received first list, at least one driver operable to control the identified device from a set of drivers, thereby generating a sub-set of said set of drivers; providing a core program logic to the target system, and providing the sub-set of drivers to the target system, wherein a combination of the sub-set of drivers and the core program logic constitutes a customized program logic operable to control the devices of said target system.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
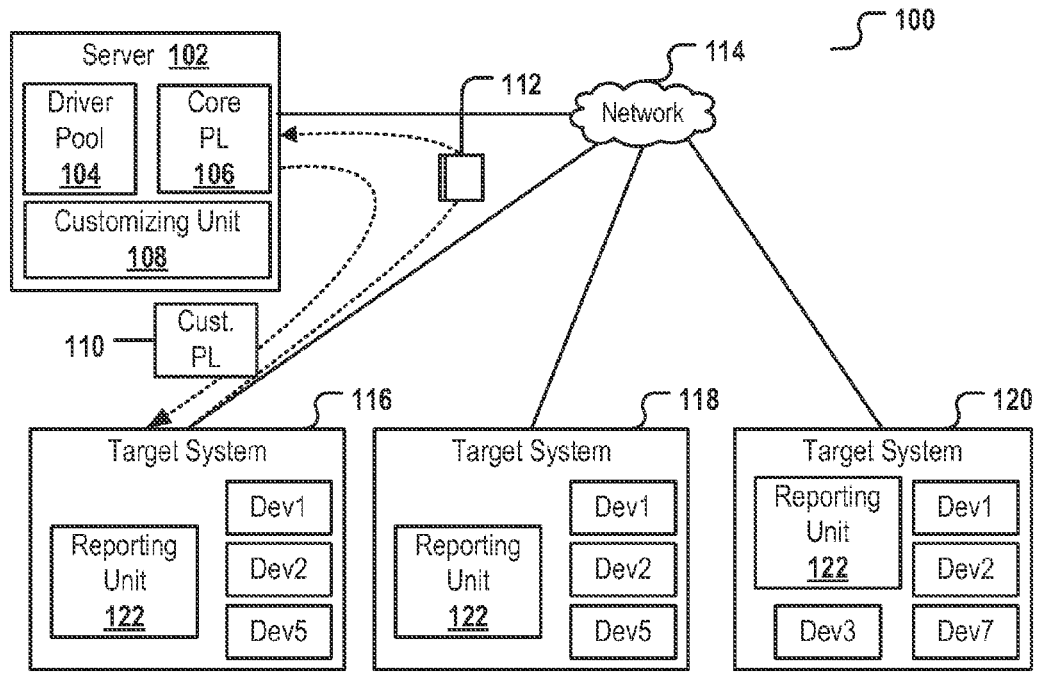
FIG. 1 is a block diagram of a distributed computer system comprising a server system and three target systems.

Embodiments of the present invention provide for an improved approach for providing program logic operable to control hardware devices of a target device and operable to boot said target device. In some embodiments, customized program logic is generated being operable to control hardware devices of at least one target system. The method and technique may include: determining, by a reporting unit of the at least one target system, the one or more hardware devices operatively connected with the at least one target system; sending, by the reporting unit, a first list of identifiers of the determined hardware devices to a server system; receiving, by the server system, the first list of device identifiers; automatically selecting from a set of drivers, by the server system, for each of the device identifiers in the received first list, at least one driver operable to control the identified device, thereby generating a sub-set of said set of drivers; and automatically complementing a core program logic with said driver sub-set to generate the customized program logic. Thus, embodiments of the present invention enables a reduction in the size of the program logic deployed to the target system, thereby increasing deployment speed and reducing network traffic. In a further beneficial aspect, the risk of driver conflicts which could prohibit or slow down the booting of the target system is reduced.

The term 'program logic' as used herein relates to a sequence of instructions executable by a processor.

The term 'hardware device' as used herein relates to a physical device that can be used and controlled by a data processing device. A hardware device may be, for example, a network card, a hard disk, a printer connected to the data processing device, a Graphics Cards or a CD/DVD Drive. A hardware device may be an integral part of or operatively connected to said data processing device.

The term 'target system' or 'target' as used herein relates to a data processing system which is operatively connected, e.g. via a network, to another data processing system referred herein as 'server computer system' or 'server'. The target system is a data processing system which shall be booted. The server system is a data processing system to enable the target system to execute the booting. The term 'operatively connected' indicates that a component is a sub-component of another component or is connected to said other component (e.g., via a network or a system bus), in a way allowing said connected components to exchange data for monitoring and/or control purposes.

The term 'driver' as used herein relates to a computer program allowing higher-level computer programs (e.g., an operating system or an application program), to interact with a hardware device. A driver typically communicates with the hardware device through the computer bus or communications subsystem to which the hardware device connects. When a calling program invokes a driver routine, the driver may send commands to the device. Upon receiving data from the hardware device, a driver may also send data back to the calling program and may even invoke routines in the calling program. Drivers are hardware-dependent and operating-system-specific programs.

A 'pre-boot environment' (PBE) as used herein is an integral part of the target system and provides some basic services, in particular basic network and disc access capabilities for downloading and operating a network boot program (NBP). The PBE may be program logic contained in the BIOS and thus may be considered as part of the firmware or hardware of the target system. Drivers having been built into the BIOS (i.e., the firmware) provide some basic functionality for performing simple operations (like loading an operating system) from disk, USB or a network. However, said kind of drivers provide very limited capabilities, are not optimized well, and are intended to be used only during the boot phase. Once the operating system or the network boot program (NBP) has been loaded, the BIOS is no longer usable and the operating system or NBP requires dedicated drivers.

The term 'boot loader' or 'network boot program' (NBP) as used herein relates to a reduced version of an operating system (OS) or deployment engine. The NBP is loaded into memory of a target system and used to deploy the full OS or deployment engine on a hard disc or the main memory of said target system. A NBP may be provided to the target system(s) (e.g., via USB-sticks, CD-ROMs, or via a network) with the help of some BIOS drivers. After the PBE has successfully downloaded the NBP to the target system, the PBE passes over control to the NBP. The NBP downloads the remaining components of the OS or the deployment engine. The NBP may interoperate with a server system for executing said download. When the download of the OS or the deployment engine completes, the NBP passes control over the devices of the target system to the downloaded deployment engine or the downloaded OS. At this point, the native drivers for the hardware devices must be available at the target system for enabling the OS or the deployment engine to control the hardware devices. An example for a NBP is the boot loader of the Windows Pre-installation Environment (WinPE). WinPE is a reduced version of Windows-XP or Windows Vista or of another Windows system. The NBP may interact with a server system for downloading the complete OS or a deployment engine that will download and install the complete OS.

A 'deployment engine' as used herein is a stand-alone mini-operating system used for management tasks to be performed outside of a full OS (such as WinXP or Linux). Said tasks may relate to partitioning and formatting disks, downloading and installing a complete OS such as Windows or UNIX, wiping the disks, or the like. In some embodiments, a deployment engine is not installed manually on a target system, but rather is downloaded automatically (e.g., when a target system is instructed to boot with the help of an OS deployment server). After the deployment engine is loaded on the target system and started, it may perform its tasks on the target system. Thus, a deployment engine is a stand-alone management platform and does not require a full OS to work. It may be used for deploying a full OS, but may alternatively be used for other purposes.

The term 'hardware management module' (HMM) as used herein relates to a piece of firmware being part of or operatively connected with a target system and providing the server systems with the capacity to call some monitoring and/or control functions in respect to hardware devices of the target system. A HMM may have a separate network connection (and its own IP address) to which the server system can connect directly without involving any NBP, deployment engine or OS of the target system for establishing the connection to the server. An example of a hardware management module is the IBM Hardware Management Console (HMC) making it possible to perform activities on a target system from a remote location.

FIG. 1 depicts a distributed computer system 100 for efficiently booting one or more target systems via a network 114 by means of a customized program logic 110. The computer system 100 comprises a server system 102 and a plurality of target systems 116, 118, and 120 connected to each other via a network 114. The storage devices of the target systems may not comprise any operating system. Rather, the operating system (OS) or customized image to be used for booting shall be transferred from the server to each of the target systems via the network as needed. The transferred deployment engine and corresponding OS or the transferred image are customized to the hardware composition of the respective target system (i.e., comprise only the drivers necessary to control the devices Dev1-Dev7 of the respective target systems). Referring to FIG. 1, a network boot system landscape allowing a dynamic, on-demand and efficient network booting also of target systems having a heterogeneous device composition will be described.

The server system comprises a driver pool 104. The driver pool comprises, for each of the devices used by any of the target systems 116-120, at least one driver. The driver pool 104 may even comprise drivers of hardware devices which are not contained in any of the target systems. For example, the driver pool 104 may consist of one or more driver-bundles provided by one or more device-manufacturers. In addition, the server system comprises a program logic core 106 (i.e., a program logic being free of any of the drivers of the driver pool) and being operable to boot each of the target systems 116-120 alone or after downloading additional executables, provided said program logic core is supplemented with the drivers of the respective target system. A customizing unit 108 of the server system is used for creating customized program logic 110, whereby the customized program logic is customized in respect to the hardware device composition of each of the target systems it is deployed to.

Each of the target systems comprises a reporting unit 122 being operable to determine the hardware device composition of said target system and being operable to send a list 112 with respective device identifiers to the server system 102 via the network 114. As the device composition of target system 116 and 118 is identical (both comprise the devices Dev1, Dev2 and Dev5), the list 112 generated by the target system 116 is identical to the list that would be generated by target system 118 and the respectively generated customized program logic 110 would also be identical. As the device composition of target system 120 slightly differs from that of the target systems 116 and 118, a slightly different driver list would be created by the reporting unit 112 of target system 120, resulting in the generation of a slightly different customized program logic for target system 120.

At first, the reporting unit 122 of target system 116 may generate a list 112 comprising device identifiers of the devices Dev1, Dev2 and Dev5. For PCI devices, said determination may be based e.g. on an analysis of the PCI bus registry. Said list is submitted to the server system via network as indicated by the dotted arrow. The customizing unit 108 of the server system evaluates the list and selects a sub-set of drivers from the driver pool 104. The sub-set of drivers is combined with the core program logic 106. The product of said combination, the customized program logic 110, is deployed by the server system via the network 114 to the target system 116. Thanks to its small size, the deployed, customized program logic can be transmitted very quickly and can be used for booting target system 116 via the network.

Figure 2:
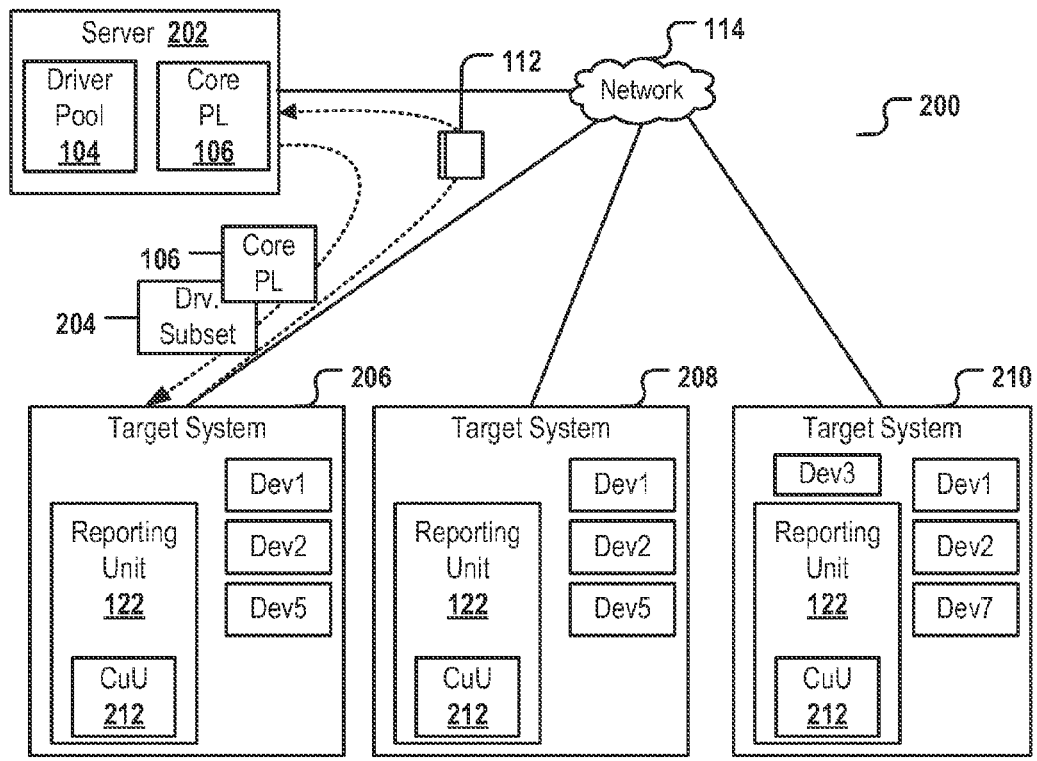
FIG. 2 depicts another distributed computer system comprising a server system and multiple target systems.

FIG. 2 depicts a distributed computer system 200 also comprising a server system 202 and multiple target systems 206, 208 and 210. The main difference between the system 100 depicted in FIG. 1 and system 200 is that in at least one of the target systems of system 200 the customized program logic is generated not on the server side, but rather by a customizing unit 212 contained in one or more of the reporting units 122. Thus, according to the system depicted in FIG. 2, the server system is still able to select, in dependence on a list of device identifiers 112 having been received from a reporting unit 212 of one of the target systems, a sub-set of drivers 204 from the driver pool 104 required for controlling the hardware devices of the target system 206 having submitted the list 112. The difference is that the server system sends the core program logic 106 and the determined driver sub-sets 204 as separate pieces of data within one or multiple messages to the target system 206. The combination of the driver sub-set and the core program logic is executed by the target system for creating the customized program logic.

Figure 3:
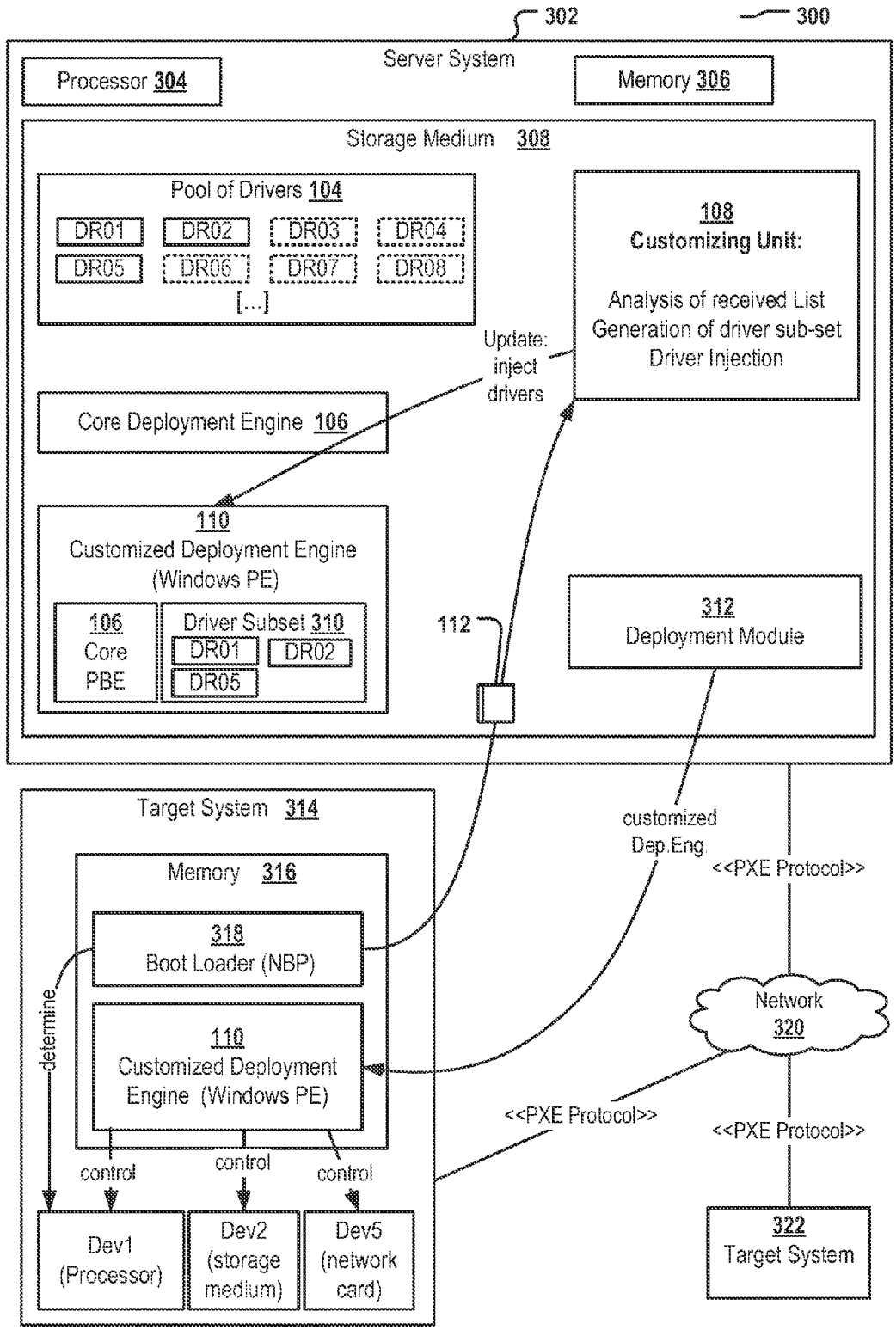
FIG. 3 is a block diagram showing components of the server system and one of the target systems in greater detail.

FIG. 3 is a block diagram depicting some components of a server system and a target system in greater detail. A distributed computer system 300 may comprise at least a server system 302 and at least target systems 314 and 322 connected to each other via network 320. The target system 314 comprises a main memory 316. A boot loader 318 having been loaded into said memory comprises some functionalities enabling said boot loader to identify all hardware devices Dev1, Dev2, Dev5 such as a graphics processor, non-volatile storage media or a network card, and to send said list to the customizing unit 108 of the server system 302.

The server system comprises a processor 304 and main memory 306. In addition, a non-volatile storage medium 308 is operatively connected with the server system 302. The storage medium comprises a pool of drivers 104, wherein said pool comprises much more drivers than actually needed for controlling any one of the target systems of system 300. In addition, a core program logic 106 (e.g., a core deployment engine 106 not containing any hardware device drivers of any one of the target systems) is stored on the storage medium. In other implementation variants (not shown), box 106 may represent not a deployment engine but rather a full OS. A customizing unit 108 is operable to receive a list 112 of hardware device identifiers from a reporting unit 318, here, a small boot loader with device identification capabilities, of each of the target systems 314. The customizing unit evaluates the received list, identifies a sub-set of drivers 310 identified by said list, and injects said identified driver sub-set 310 into the core deployment engine. Thereby, the customized program logic, in this case a customized deployment engine is created. The deployment module 312 is operable to deploy the deployment engine 110 to the target system 314 from which the list 112 was received. The customized deployment engine is loaded into the memory 316 of the target system and uses its injected drivers DR01, DR02 and DR05 for downloading a corresponding full OS from the server. Said drivers enable the downloaded full OS to control the respective devices Dev1, Dev2 and Dev5 for booting and optionally also operating the target system 314. The OS-downloading step may comprise downloading the full operating system from the server system 302 and storing the downloaded full OS to a non-volatile storage medium.

Figure 4:
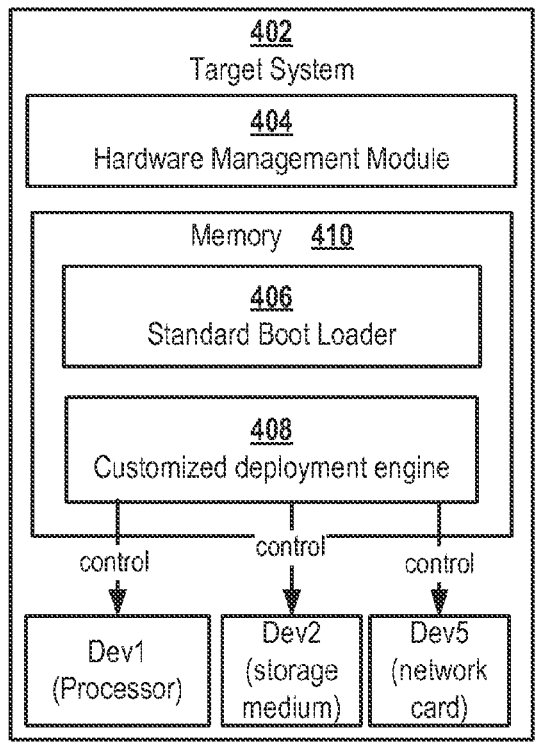
FIG. 4 shows a target system comprising a hardware management module.

FIG. 4 depicts a target system 402 using a hardware management module 404 as a reporting unit. The target system 402 may be element of a distributed network boot environment 100, 200, 300 as depicted, for example, in FIGS. 1-3. The target system comprises a main memory 410 comprising a standard boot loader 406. The standard boot loader (i.e., a network boot program) requests the deployment of a deployment engine from the server system by leveraging PXE services. The server system may receive this request and send a command to an interface of the hardware management module 404 for triggering the hardware management module to identify all hardware devices Dev1, Dev2, Dev5 operatively connected with the target system 402. The hardware management module 404 generates a list comprising identifiers of the hardware devices Dev1, Dev2 and Dev5 and sends said list to the server system. This enables a customizing unit 108 of the server system to extract a sub list of drivers operable to control the drivers of the target system 402 and for generating a lightweight, customized deployment engine 408 only comprising drivers of said sub-set. The customized deployment engine 408 is deployed by a deployment unit of the server system to the main memory 410 of the target system 402. There, the customized deployment engine may be executed e.g. for partitioning some discs or for interoperating with the server system for downloading a corresponding full operating system via the network and for storing the downloaded operating system to a non-volatile storage medium with the help of a corresponding one of the drivers of the customized deployment engine.

In a re-imaging system, the successive downloading of a customized deployment engine and a corresponding full OS may not be required. Rather, the core image, if combined with the necessary drivers, already comprises the OS and other runtime environment instructions which shall finally be deployed to a target system and used by an end-user.

Figure 5:
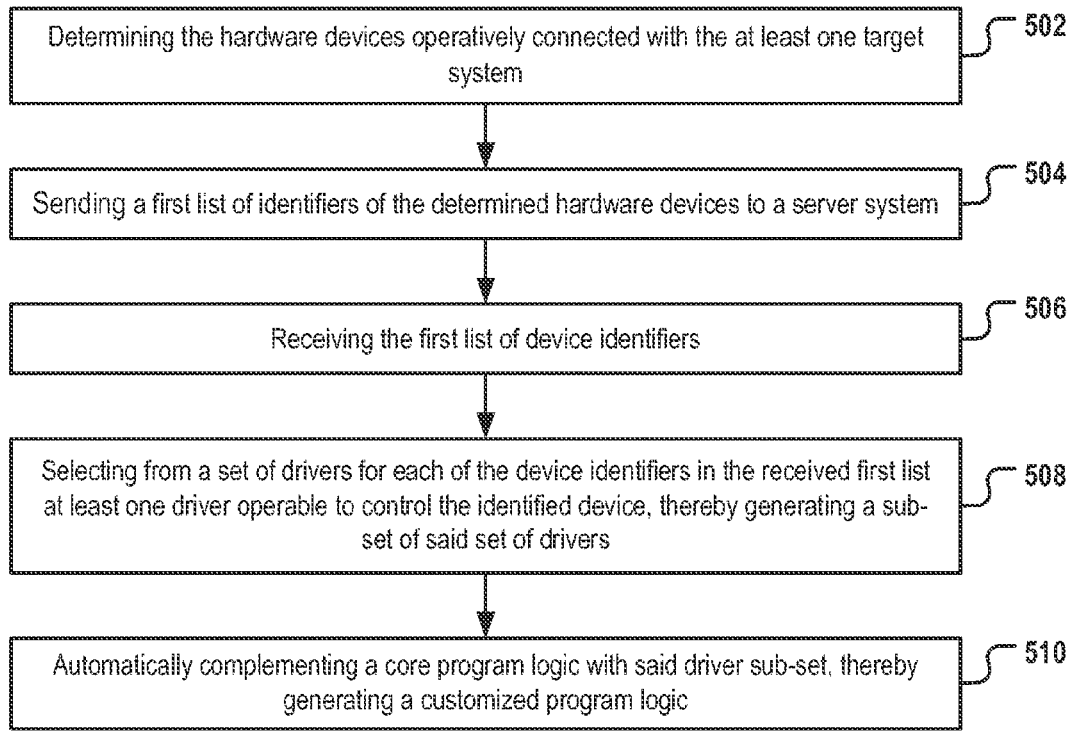
FIG. 5 depicts a process of creating a customized program logic for booting a target system.

FIG. 5 depicts a flowchart of a method comprising the steps of determining, in step 502, one or more hardware devices operatively connected with at least one of the target systems of a distributed, network-boot system, e.g. a bare metal deployment system or a re-imaging system. The step is done by a reporting unit residing in one of the target systems. In step 504 the reporting unit sends a list 112 of device identifiers of the determined hardware devices to the server system. In step 506, the server system receives the list of device identifiers and selects, in step 508, a sub-set of drivers from a larger set of drivers. For example, said sub-set of drivers may be identified by evaluating a mapping comprising a list of device identifiers and associated drivers or driver identifiers. Thereby, the server system selects at least one driver from a driver pool for each of the device identifiers. The at least one selected driver may be a set of candidate drivers. In step 510, a customizing unit of the server system (or a functionally corresponding sub-module of the reporting unit in the target system having sent the list) complements a core program logic with said selected driver sub-set. Thereby the customized program logic is generated.

Figure 6:
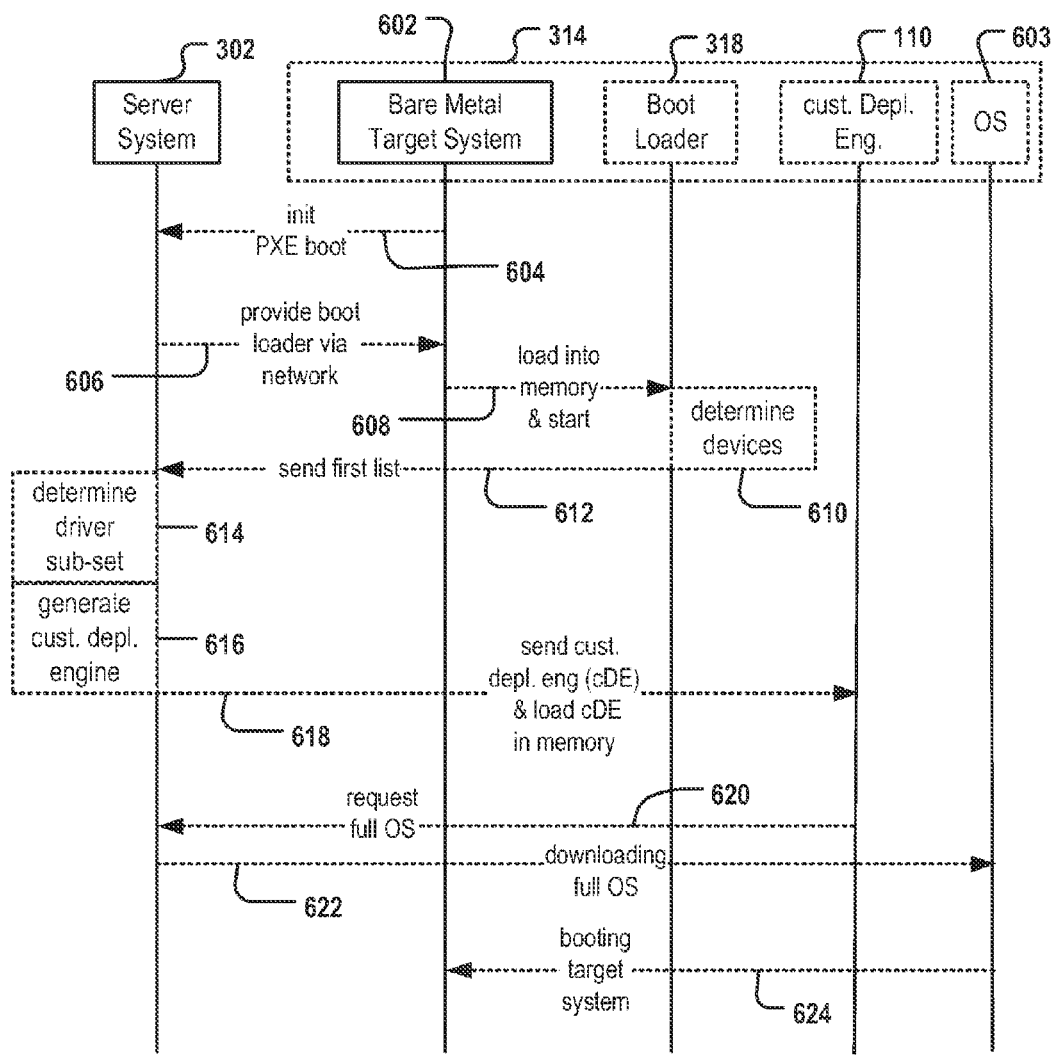
FIG. 6 shows a process of downloading a deployment engine and corresponding operating system via a network.

FIG. 6 shows a process of downloading a customized deployment engine and corresponding operating system via network from a server system 302 for booting a target system 314. The target systems 314 may at the beginning be a 'bare metal' target system 602 not comprising any operating system. The bare metal target system 602 may automatically or upon a user interaction with said system send a command 604 for initializing the booting of the target system. The command may be sent by using firmware and/or software facilities provided by a PXE boot system landscape. Upon receiving the commands 604, the server system sends a boot loader (acting as NBP) via a network in step 606 to the bare metal target system. The boot loader 318 is loaded into the memory of the target system and is started in step 608. The boot loader automatically determines a set of hardware devices in step 610 which are operatively connected to the target system. The boot loader 318 sends in step 612 the list of device identifiers to the server system, thereby enabling the server system to determine in step 614 a sub-set of the available drivers operable to control the hardware devices of the target system. The server system generates a customized deployment engine comprising the determined driver sub-set in step 616 and sends the customized deployment engine in step 618 to the target system. The customized deployment engine comprises all drivers necessary to boot the target system, but not more. In the target system, the customized deployment engine is loaded into the main memory. The customized deployment engine 110 in step 622 in interoperation with the server system downloads a full operating system corresponding to the customized deployment engine and stores the full operating system using one of the drivers of the customized deployment engine in a non-volatile storage medium (Dev2). Then, the deployment engine downloads a corresponding OS and stores it to a hard disk. The downloaded OS may be used for directly controlling the booted target system. Booting a bare metal target system via network may comprise the deployment engine starting the installation of the OS (e.g., by copying the OS files and the drivers received via network on the hard disk). In order to complete the installation, the target system is rebooted one or more times. Once the copying of the OS files and the customization has been completed, the target system reboots and the partially installed OS takes control to complete the installation process.

Thus, in one aspect, the invention relates to a computer implemented method for generating customized program logic being operable to control hardware devices of at least one target system. In some embodiments, said customized program logic is also operable to boot said at least one target system. The method comprises: determining, by a reporting unit of the at least one target system, the hardware devices operatively connected with the at least one target system; sending, by the reporting unit, a first list of identifiers of the determined hardware devices to a server system; receiving, by the server system, the first list of device identifiers; automatically selecting from a set of drivers, by the server system, for each of the device identifiers in the received first list, at least one driver operable to control the identified device, thereby generating a sub-set of said set of drivers; automatically complementing a core program logic with said driver sub-set, thereby generating the customized program logic. The core program logic is free from any one of the drivers of the driver set.

Said features may be advantageous as they may allow to significantly (in some cases up to 50% and more) reduce the size of the program logic deployed to the target system, thereby increasing deployment speed and reducing network traffic. In a further beneficial aspect, the risk of driver conflicts which could prohibit or slow down the booting of the target system is reduced.

According to some embodiments, the reporting unit is a boot loader of the core program logic. The boot loader may have been deployed to the memory of the at least one target system. The core program logic may be a deployment engine or an OS. In some embodiments, the boot loader is of very small size, preferentially less than 5% of the size of the corresponding deployment engine or OS. Integrating a driver detection and list submission functionality into a boot loader may be advantageous as existing network boot architectures making use of boot loaders need only minimally to be modified for providing an improved and more efficient network boot environment: exchanging a conventional boot loader by a boot loader comprising said features or adding said features to a conventional boot loader being interoperable with the server system may suffice.

In a further beneficial aspect, transferring a deployment engine or an operating system lacking an important driver is prohibited from the beginning, thereby prohibiting the waste of network resources. In a further beneficial aspect, said features ease the maintenance of network boot systems. Currently, an operator of such systems has to manually make sure that any deployment engine or operating system deployed to a bare metal target system comprises all necessary drivers. This may be a highly complex, error prone and time consuming task and may result in the generation of deployment engines or operating systems comprising much more drivers than actually needed. In a further beneficial aspect, the reduction of the number of drivers deployed to the target system reduces the chance of driver conflicts which might otherwise result in an aborting of the booting process.

According to further embodiments, the reporting unit is a further program logic having been deployed to the memory of the at least one target system. Said program logic may not comprise any boot loader functionality. Therefore, said embodiments are preferentially used in combination with a standard boot loader.

According to still other embodiments, the reporting unit is a hardware management module of the at least one target system. According to some embodiments, the hardware management module may comprise program logic providing for a web service. The web service may provide a callable interface returning, upon a call by the server system, the first list of device identifiers of devices contained in the target system comprising or being operatively connected with the hardware management module. This may be advantageous as each of the target systems may already come with some inbuilt functionalities supporting network boot. The hardware management module may be adapted to communicate with the server system via a network without involving or requiring any OS or NBP on the target system side.

According to some embodiments, the core program logic is a deployment engine being free of any one of the drivers of the driver set, the deployment engine being a program logic operable to deploy an operating system in interaction with a server system. The customized program logic is a combination of said deployment engine and the driver sub-set. According to other embodiments, the core program logic is a full operating system being free of any one of the drivers of the driver set. Said features may be advantageous as the size of the customized and deployed deployment engine as well as the size of the operating system is reduced as none of them comprises drivers of devices which are not part of the target system.

According to other embodiments, the core program logic is an image of a runtime environment. Said image does not comprise any one of the drivers of the driver set. The customized program logic is a combination of said image and the driver sub-set. The customized program logic is operable to control the devices of the at least one target system after having been installed on the at least one target system. The runtime environment may comprise, for example, operating system logic and optionally also application program logic and/or user data. The runtime environment may also be a virtual machine simulating a hardware machine and being used, for example, for desktop virtualization. Said features may provide an improved re-imaging system operable to efficiently provide images to one or more target systems.

According to some embodiments, the complementing of a core program logic with a driver sub-set is executed by the server system. The server system may be operatively connected with a storage medium having stored the set of drivers and the core program logic. The method further comprises sending the customized program logic to the at least one target system. This may be advantageous as the completion work has to be done only once on the server side.

According to further embodiments, sending the customized program logic to the at least one target system comprises sending the customized program logic to a plurality of target systems. Each of said target systems comprises devices of the same device types as comprised by the target system having sent the first list of device identifiers to the server system. The server may be able to receive lists of device identifiers from many different target systems and compare the lists with each other in order to determine if the target systems comprise the same set of hardware devices. Preferentially, the sending of the customized program logic to a plurality of target systems comprising the same set of hardware devices is executed using a multi-cast data transfer technique. Multicast transfer implies that the customized program logic is delivered in a single transmission from the server to multiple target systems. Copies of the customized program logic are automatically created in network elements, such as routers, only when the topology of the network requires it. Said features may be advantageous as using multi-cast data transfer techniques reduces the data traffic by avoiding transferring multiple copies of the same piece of data when deploying the core program logic.

According to some embodiments, the complementing of a core program logic with a driver sub-set is executed by the reporting unit of the at least one target system. The server system is operatively connected with a storage medium having stored the set of drivers, also referred herein as 'driver pool', and the core program logic. The method further comprises, before complementing the core program logic: sending, by the server system, the core program logic and the sub-set of drivers to the at least one target system; and receiving, by the at least one target system, program logic and the sub-set of drivers. Depending on the embodiment, the sending of the core program logic and the sub-set of drivers may be executed via one single message or via multiple messages.

According to embodiments, sending the core program logic to the at least one target system comprises sending the core program logic selectively to a plurality of target systems respectively comprising devices of the same or of different device types. The sending of the sub-set of drivers to the at least one target system comprises sending the sub-set of drivers to one or more target systems respectively comprising devices of the same device types as comprised by the target system having sent the first list to the server system. Thus, the server may be operable to check if a driver sub-set having been created for one of the target systems also fits to the hardware device composition of other target systems. Said features may be advantageous as they ensure that each target system receives all device drivers required for controlling its own hardware devices, but not more.

In some embodiments, said sending of the core program logic is executed by using a multi-cast data transfer technique. In some embodiments, said sending of the sub-set of drivers is executed by using a single-cast data transfer technique. Sending the core program logic and the driver sub-set via said two different communication protocols may be advantageous as said approach allows transferring at least the program logic core according to the multicast transmission protocol, thereby reducing the network traffic and accelerating the method. If the customized program logic would be transferred as one single piece of data rather than as two separate components, a distributed network boot system comprising target systems of different hardware device composition would necessarily have to apply single cast transmission protocols, thereby increasing data traffic.

According to some embodiments, a command referred herein as 'driver-download-command' is submitted by the reporting unit of the at least one target system to the server system. The command triggers the sending of the sub-set of drivers from the server system to the at least one target system.

According to some embodiments, the server system analyzes a predefined program logic for determining device drivers contained in said predefined program logic. The server system then removes all determined device drivers which are not identified by any one of the device identifiers contained in the received first list from said predefined program logic. Thereby the customized program logic is created. According to other embodiments, the server system generates the core program logic by removing all determined device drivers from said predefined program logic. Said features may be advantageous as many hardware device manufacturers provide large driver bundles covering all device types and respective device versions provided by said manufacturer. Said driver bundles may be stand-alone bundles or may already be integrated into an OS or corresponding deployment engines, thereby significantly increasing the size of said OS and deployment engines. By removing all drivers actually not required by a target system from said OS-driver bundles or deployment engine-driver bundles, the program logic core can be generated automatically taking said predefined bundles as input.

According to some embodiments, the reporting unit of the at least one target system receives a booting command from the server system via a network. The network may be an Internet or intranet, for example. The receipt of the booting command triggers the generation and sending of the first list of device identifiers.

According to some embodiments, the customized program logic is generated for a first one of the one or more target systems. The method further comprises: receiving a second list of device identifiers from a second one of the target systems. The second list shares a plurality of device identifiers with the device identifiers in the first list. The second list comprises at least one device identifier not contained in the first list. A further customized program logic is generated for the second target system by complementing the customized program logic generated for the first target system with at least one driver. Said at least one driver is operable to control the at least one device identified by the at least one device identifier of the second list not being contained in the first list of device identifiers. The further customized program logic is sent to the second target system. Said features may be advantageous as they provide a good compromise between the processing load caused by generating the customized program logic on the server system and the network traffic generated by transferring the drivers of the driver sub-set to the target systems: in many cases it can be assumed that the hardware device composition of the target systems within a network boot environment is similar, but not identical. Usually, there exist a limited number of target system types mostly coming from a single vendor. Thus, there may be overlaps in respect to the required drivers. The processing load of the server system may be reduced by creating the customized program logic only for one of the target systems, thereby significantly reducing the overall size of the data to be deployed to the target system. For all the other target systems, or at least for target systems being similar to the first target system, the already created customized program logic is supplemented only with the drivers required in addition by the other, similar target systems. Thus, there may be some few drivers in said customized program logic created for the other similar target systems which are not required by said similar target systems. However, the savings in terms of processing power of the server may outweigh the network traffic caused in addition by said few additional, non-required drivers.

According to some embodiments, the sub-set of drivers comprises, for at least one of the hardware devices of the target system, a plurality of candidate drivers for controlling one of the hardware devices of the target system. The method further comprises: booting the target system by means of the drivers contained in the customized program logic; a) while booting the target system, selecting, by the customized program logic, a first one of the candidate drivers to control said hardware device; b1) in case said first candidate driver is determined to be operable to control said hardware device, storing an indication that said candidate driver is capable of controlling said hardware device in a storage medium and continuing the booting of the target system without using the other candidate drivers of said hardware device for controlling said hardware device; b2) in case said first candidate driver is determined not to be operable to control said hardware device, storing an indication that said candidate driver is not capable of controlling said hardware device in a storage medium and re-booting the target system. Upon re-boot, steps a) and b) are repeated by selecting another one of said candidate drivers not having been selected in a previous re-boot cycle. Said repeating is executed until at least one of the candidate drivers is identified as being operable to control said hardware device.

Including, for at least some of the hardware device identifiers, a respective set of candidate drivers may be advantageous, because due to the huge amount of combinatorially possible hardware device combinations, it may sometimes be the case that some drivers used during the boot of the target system may conflict. This may not be foreseeable in advance. By including, for one or more of the identified hardware devices a set of candidate drivers rather than one single driver into the driver sub-set and the corresponding customized program logic, the target system may be enabled to boot even in case one of the drivers should turn out not to work in combination with the other drivers of the sub-set.

In state of the art systems, in case the driver conflict arises during boot, an error is thrown which has to be handled by corresponding program routines implemented in the OS which performs the booting. Specifying such error handling operations is time-consuming and may not be able to foresee any kind of conflict that may arise in respect to other drivers which may not even exist at the time when the OS is written. By storing information which kind of candidate driver was not operable to control its respective device in a storage medium not erasing its data upon reboot, an automated driver conflict-management procedure is provided which may also be applicable if the OS or deployment engine does not comprise any error handling routines for dealing with driver conflicts during system boot.

According to some embodiments, said storage medium used for storing failed driver information is a section in the BIOS or a storage module comprising a Unified Extensible Firmware Interface (UEFI).

According to some embodiments, the candidate drivers having been determined to be able to control the respective hardware devices of the target system are communicated from said target system to the server system. The server may use this information when generating the customized program logic for avoiding the inclusion of candidate drivers into the customized program logic having been determined not to be operable to control a particular device per se or determined not to be operable to control a device if provided as member of said particular, previously used driver-sub-set. Thus, the quality and compatibility of the selected driver sub-set and the corresponding customized program logic may be improved.

In a further aspect, the invention relates to a computer-readable storage medium comprising computer-readable program code embodied therewith which, when executed by a processor, causes the processor to execute a method according to the present invention.

In a further aspect, the invention relates to a server system being connected to one or more target systems via a network. The server system is adapted for: receiving a first list of device identifiers from one of the target systems; automatically selecting, for each of the device identifiers in the received first list, at least one driver operable to control the identified device from a set of drivers, thereby generating a sub-set of said set of drivers; providing a core program logic to the target system; and providing the sub-set of drivers to the target system, wherein a combination of the sub-set of drivers and the core program logic constitutes a customized program logic operable to control the devices of said target system. Said program logic may also be operable to boot the one target system.

According to some embodiments, the providing of the core program logic and the providing of the driver sub-set comprises generating, by the server system, the customized program logic and sending said customized program logic to said target system.

A target system being connected to a server system via a network, the target system comprising hardware devices, the target system comprising a reporting unit being adapted for: determining the hardware devices operatively connected with said target system; sending a first list of identifiers of the determined hardware devices to the server system; receiving, in response to sending said first list, a sub-set of drivers from the server system, the sub-set of drivers comprising, for each of the determined hardware devices, a respective driver operable to control said hardware device; receiving, in response to sending said first list, a core program logic from the server system; and wherein a combination of the sub-set of drivers and the core program logic constitutes a customized program logic operable to boot the target system and to control the devices of said target system.

According to some embodiments, the target system is further adapted for complementing the received core program logic with the received driver sub-set. Thereby the customized program logic is generated on the target system side.

In a further aspect, the invention relates to a distributed network boot environment comprising at least one server system and two or more target systems.

According to some embodiments, the server system and the one or more target systems are part of a 'Preboot eXecution Environment' (PXE). PXE is an environment to boot a target system using a network interface independently of data storage devices (like hard disks) or installed operating systems. The target systems may not even comprise any OS. Rather, a network boot program (NBP) loaded into a main memory of the target system interoperates with the server for downloading a corresponding OS or deployment engine from the server. For several tasks in the deployment process, e.g. for storing the downloaded OS on a non-volatile hard disk, the deployment engine requires some drivers allowing the deployment engine to access said hard disk. For example, a network driver allowing the deployment engine to open a network connection to the server and to download the full operating system via the network may be required. The NBP may use the functions provided as firmware- or hardware-based functions by the PXE to access the network or the disk. Thus, the PXE may provide some basic drivers for downloading the OS or the deployment engine, but after the NBP passes control to the Deployment Engine or to the OS (which cannot make use of the PXE-environment), the Deployment engine or the OS require native drivers.PXE makes use of several network protocols like Internet Protocol (IPv4), User Datagram Protocol (UDP), and Dynamic Host Configuration Protocol (DHCP) and extends the firmware of the target system acting as PXE client with a set of predefined Application Programming Interfaces (APIs). According to embodiments, PXE supportive firmware components of the respective target systems, e.g. a PXE supportive hardware management module, are operable to locate a PXE redirection service on the network in order to receive information about available PXE boot server systems. The answer of the PXE redirection service is evaluated by said firmware of the target system for determining the server system to act as boot server. Then the deployment engine is downloaded from the server and stored into the main memory of the target system (no driver is required by a target system for accessing its RAM). The downloading may be executed based on the TFTP protocol. The downloaded deployment engine may optionally be evaluated and be executed for downloading the full OS from the server system and for booting the target system via the downloaded OS.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Aspects of the present invention are described below with reference to embodiments of the invention depicted in the figures.

What is claimed is:

1. A server system being connected to one or more target systems via a network, the server system being adapted for:
   receiving a first list of device identifiers from one of the target systems;
   analyzing a predefined program logic for determining device drivers contained in said predefined program logic;
   removing all determined device drivers which are not identified by any one of the device identifiers contained in the received first list from said predefined program logic;
   automatically selecting, for each of the device identifiers in the received first list not having a device driver in said predefined program logic, at least one driver to control the identified device from a set of drivers, thereby generating a sub-set of said set of drivers;
   injecting the sub-set of drivers into the predefined program logic to create a customized program logic for the one target system;
   triggering the sending of the customized program logic to the one target system by a driver-download-command submitted by the one target system; and
   deploying the customized program logic to the one target system, the customized program logic to control the devices of the one target system and download an operating system to the one target system.

2. A target system being connected to a server system via a network, the target system comprising:
   hardware devices;
   storage devices, the storage devices not comprising any operating system;
   a reporting unit being adapted for:
      determining the hardware devices operatively connected with said target system;
      sending a first list of identifiers of the determined hardware devices to the server system;

receiving, in response to sending said first list, a sub-set of drivers from the server system, the sub-set of drivers comprising, for a first portion of each of the determined hardware devices, a respective driver to control said hardware device; and receiving, in response to sending said first list, a core program logic from the server system, the core program logic having drivers to control a second portion of the determined hardware devices but being free of any drivers of the sub-set of drivers; and a customizing unit for generating a customized program logic using a combination of the sub-set of drivers and the core program logic, the customized program logic to control the hardware devices of said target system and download an operating system to the target system.

* * * * *